Patented June 24, 1930

1,767,528

UNITED STATES PATENT OFFICE

WILLIAM E. JONES, OF MILWAUKEE, WISCONSIN, ASSIGNOR TO EAGLE CHEMICAL COMPANY, OF MILWAUKEE, WISCONSIN, A CORPORATION OF WISCONSIN

CLEANING AND DISINFECTING COMPOUND

No Drawing.   Application filed November 5, 1928.   Serial No. 317,498.

This invention relates to a cleaning and disinfecting compound especially designed for household purposes although also adapted for universal application.

Traps, closet bowls and similar plumbing fixtures frequently become discolored or coated or partially covered with deposits or incrustations which are rather difficult to remove. To a large extent such discoloration and deposits result mainly from iron and lime salts contained in the water. For removing these deposits it has been proposed to utilize various cleaning compounds which contain chemical substances operating to convert the iron and lime salts into soluble sulphates. For instance, it has been proposed to use sodium bisulphate and potassium chloride for this purpose, and in the co-pending application of W. E. Jones, filed April 23, 1927, serial No. 186,176, it has been proposed to employ sodium bisulphate, an alkaline chloride such as sodium chloride, and an oxidizing agent so that the deposits are not only converted into soluble sulphate but the bowl or trap is also subjected to a series of cleansing operations involving that described and the transient and successive action of hydrochloric acid and chlorine. Such a composition is substantially inert at atmospheric dryness and only becomes active when mixed in the water in the trap or bowl. To prevent lumping or consolidation of such a normally inert cleaning compound the prior application referred to proposes the addition of a small amount of corn starch to the compound. This has been found to work out very well in practice under most conditions, but where the compound is packaged and stored over a period of months and where the atmosphere contains a large percentage of moisture the sodium bisulphate, the sodium chloride, and the oxidizing agent have all absorbed a certain amount of moisture as these substances are all hygroscopic to a certain extent. This is extremely undesirable even when occurring at infrequent intervals because it results in a lumping or caking and also in an activation of the compound to some extent.

One of the principal objects of the present invention is to provide a compound of this character which will retain its granular condition and its inert property even when stored over a long period of time and even when very humid conditions are met. And this advantage is realized without cutting down the efficacy of the compound by introducing into it a large percentage of an inert material tending to prevent consolidation or caking.

In carrying out the present invention a cleaning and disinfecting compound is provided which consists of a dry mixture of an alkaline chloride such as common salt or potassium chloride, bisulphate of soda or niter cake, an oxidizing agent which will not absorb moisture from the atmosphere, and corn starch. The critical element of the present compound is the oxidizing agent which has the property of not absorbing moisture from the atmosphere and such an oxidizing agent is barium peroxide. This oxidizing agent is well distributed throughout the compound and supplements the action of the corn starch in preventing consolidation and caking and also due to its moisture repellent properties prevents such absorption of moisture as will activate the cleaning and disinfecting compound. But, this oxidizing agent, barium peroxide, when mixed with water, becomes an active element of the cleaning and disinfecting compound as will hereinafter appear.

In preparing this compound the ingredients are preferably mixed in about the following proportions:

|  | Pounds |
|---|---|
| Common salt or potassium chloride | 48 |
| Commercial niter cake or bisulphate of soda | 48 |
| Barium peroxide | 2 |
| Corn starch | 2 |

The several ingredients are thoroughly mixed and are then packaged in cartons or the like at atmospheric dryness. Due to the moisture repellent properties of the oxidizing agent employed, the compound will not absorb any appreciable amount of moisture from the atmosphere and will remain entirely inert. If any re-action occurs it is very slight and does not extend beyond the exposed surface of the mixture. In the carton only a very small surface area is exposed. When sprinkled or mixed in the water of a bowl or trap a series of re-actions are set up. In the first place, the sodium bisulphate converts the lime and iron salts of the deposits on the bowl or trap into soluble sulphates, this phase of the re-action progressing as follows:

$$2NaHSO_4 + CaCO_3 \rightarrow CaSO_4 + Na_2SO_4 + CO_2 + H_2O$$
$$2NaHSO_4 + Fe(OH)_2 \rightarrow FeSO_4 + Na_2SO_4 + 2H_2O$$
$$6NaHSO_4 + 2Fe(OH)_3 \quad Fe_2(SO_4)_3 + 3Na_2SO_4 + 6H_2O$$

The sodium bisulphate also coacts with the potassium chloride to produce hydrochloric acid, this phase of the re-action progresssing as follows:

$$NaHSO_4 + KCl \rightarrow Na_2SO_4 + K_2SO_4 + 2HCl$$

The hydrochloric acid acts on the incrustations or deposits as follows:

$$CaCO_3 + 2HCl \rightarrow CaCl_2 + CO_2 + H_2O$$
$$Fe(OH)_2 + 2HCl \rightarrow FeCl_2 + 2H_2O$$

Further, the hydrochloric acid and the barium peroxide re-act to produce chlorine which exerts a very thorough cleansing, disinfecting and bleaching action, this latter re-action progressing as follows:

$$4HCl + BaO_2 \rightarrow 2H_2O + BaCl_2 + Cl_2$$

And the barium peroxide itself exerts a very effective bleaching action on the trap or bowl. Thus, the barium peroxide functions as an oxidizing agent, and as a bleaching agent and yet it will not absorb water from the air.

The invention claimed is:

A cleaning and disinfecting composition formed by mixing together the following ingredients: an alkaline chloride—48 parts, bisulphate of soda—48 parts, barium peroxide—2 parts, and a substance tending to prevent lumping and consolidation—2 parts.

In witness whereof, I hereto affix my signature.

WILLIAM E. JONES.